United States Patent
Oh et al.

(10) Patent No.: US 7,681,206 B2
(45) Date of Patent: Mar. 16, 2010

(54) SYSTEM AND METHOD FOR PROVIDING DIGITAL CONTENTS USING OPEN API

(75) Inventors: Hyun Woo Oh, Kyungki-do (KR); Moon Kyun Oh, Daejeon (KR); Young Boo Kim, Chungcheongnam-do (KR); Kwon Chul Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 863 days.

(21) Appl. No.: 10/941,139

(22) Filed: Sep. 14, 2004

(65) Prior Publication Data

US 2005/0091662 A1 Apr. 28, 2005

(30) Foreign Application Priority Data

Oct. 28, 2003 (KR) ...................... 10-2003-0075634

(51) Int. Cl.
*G06F 3/00* (2006.01)
*G06F 13/00* (2006.01)
*G06F 15/16* (2006.01)
*G06Q 30/00* (2006.01)

(52) U.S. Cl. ........................ 719/328; 715/700; 715/760; 715/961; 715/962; 709/201; 705/26

(58) Field of Classification Search .................. 719/328; 705/26–27; 715/700, 730, 760, 961, 962; 709/201
See application file for complete search history.

(56) References Cited

U.S. PATENT DOCUMENTS

| 6,961,943 | B2 * | 11/2005 | Miller et al. ................. 719/328 |
| 7,069,586 | B1 * | 6/2006 | Winneg et al. ................. 726/16 |
| 2002/0004855 | A1 * | 1/2002 | Cox et al. .................... 709/328 |
| 2002/0120790 | A1 * | 8/2002 | Schwalb ...................... 709/328 |
| 2003/0036963 | A1 * | 2/2003 | Jacobson et al. .............. 705/26 |
| 2003/0126027 | A1 * | 7/2003 | Nelson et al. ................. 705/26 |
| 2003/0154145 | A1 * | 8/2003 | Yamamoto et al. ............ 705/28 |

(Continued)

FOREIGN PATENT DOCUMENTS

KR 20010093040 10/2001

(Continued)

OTHER PUBLICATIONS

Portal Server TEchnology, IEEE Internet Computing, May/Jun. 2003, Christian WEge, pp. 73-77.

(Continued)

*Primary Examiner*—Hyung S Sough
*Assistant Examiner*—Qing-Yuan Wu
(74) *Attorney, Agent, or Firm*—Blakely, Sokoloff, Taylor & Zafman

(57) ABSTRACT

Provided are a system and a method for providing contents using an open API. A contents storing unit stores at least one contents. An open API unit is common to upper applications on the basis of a wired network interface and provides an API that is a communication function realized as components. A communication capability providing unit combines the API with the contents selected by the contents provider, and adds a communication function to the contents on the basis of usable network resources. The contents providing unit provides contents in which a communication function is added.

14 Claims, 5 Drawing Sheets

U.S. PATENT DOCUMENTS

| | | | |
|---|---|---|---|
| 2004/0225569 A1* | 11/2004 | Bunnell | 705/26 |
| 2005/0010634 A1* | 1/2005 | Henderson et al. | 709/201 |
| 2005/0125308 A1* | 6/2005 | Puentes et al. | 705/26 |

FOREIGN PATENT DOCUMENTS

| | | |
|---|---|---|
| KR | 1020030015736 | 2/2003 |
| KR | 1020030066180 | 8/2003 |
| KR | 1020030072693 | 9/2003 |

OTHER PUBLICATIONS

WPM P1-10, Portal Directory Broadcast System, Y. Yamagishi, et al., 2000 IEEE, pp. 210-211.

* cited by examiner

SYSTEM AND METHOD FOR PROVIDING DIGITAL CONTENTS USING OPEN API

BACKGROUND OF THE INVENTION

This application claims the priority of Korean Patent Application No. 2003-75634, filed on Oct. 28, 2003, in the Korean Intellectual Property Office, the disclosure of which is incorporated herein in its entirety by reference.

1. Field of the Invention

The present invention relates to a system for providing contents using an open application program interface (API) and a method thereof, and more particularly to a system for providing contents that discloses the network resources to each user by dividing the communication functions into components for the network resources that are provided through the open API, and combining them with the mega-contents that the users have created.

2. Description of the Related Art

Conventional contents portal services usually include basic services to users immediately after they first log onto the web. The main services that are provided include, for example, a web site directory service. A web site directory service searches different sites or provides services such as news, weather, information, electronic mail, stock trading, map information, personal home page management, and public opinion, and so on. A conventional contents portal service advertises mainly on-line the contents, which the websites have, and a user can use the contents by web surfing on-line.

In such a conventional contents portal service, a user can only register contents that the user created through the portal site and cannot add communication functions or form a mega portal, which combines the already existing contents of various kinds of the portal site. Therefore, contents that are related to a user's individual tastes and interests, cannot be generated and there are limitations in advertising and providing information for using the contents.

In the conventional contents portal service, instead of using the net resources, only the provided contents can be surfed which does not facilitate a new business model that will generate profit to network entrepreneurs.

SUMMARY OF THE INVENTION

The present invention provides a system and a method for providing contents using an open application program interface (API) by particularly to a system for providing contents that discloses the network resources to each user so that he/she can provide application services adequate to personal taste, the purpose of contents providing service.

According to an aspect of the present invention, there is provided a system for providing contents using open API including:

According to another aspect of the present invention, there is provided a method for providing contents using open API including:

BRIEF DESCRIPTION OF THE DRAWINGS

The above and other features and advantages of the present invention will become more apparent by describing in detail exemplary embodiments thereof with reference to the attached drawings in which:

FIG. 5 is a flow chart illustrating the operation process of an embodiment of the present invention in which a method of providing personal contents using an open API is applied to.

DETAILED DESCRIPTION OF THE INVENTION

The above and other features and advantages of a contents provider system using an open API and a method of using the same according to the present invention will become more apparent by describing in detail exemplary embodiments thereof with reference to the attached drawings.

Figure 1:
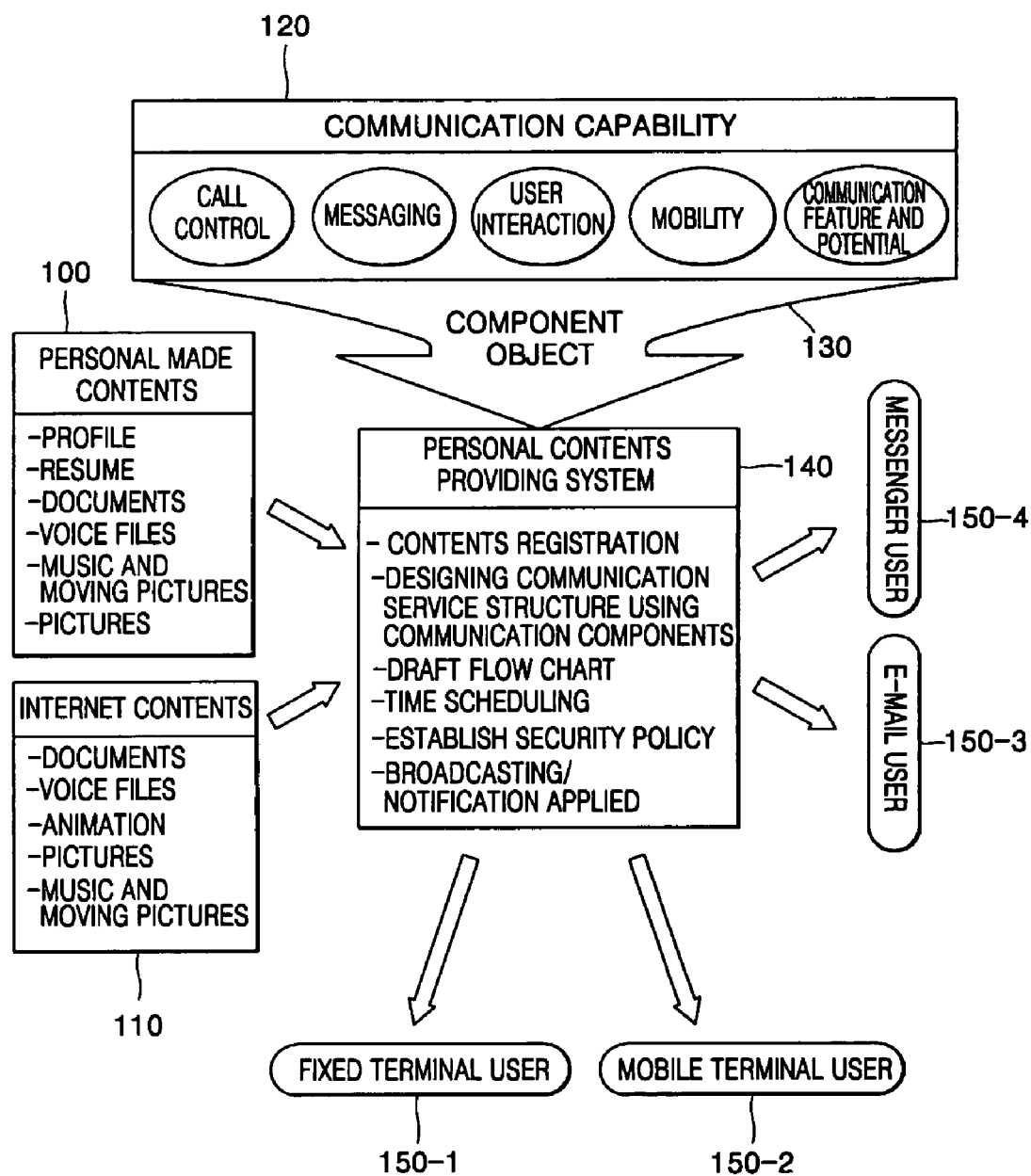
FIG. 1 is a conceptual block diagram of a personal contents providing system that opens network resources to a personal user using open API according to an embodiment of the present invention.

FIG. 1 is a conceptual block diagram of a personal contents providing system that opens network resources to a personal user using open API according to an embodiment of the present invention Referring to FIG. 1, each contents provider providing a personal contents service generates various personal contents 100. Profiles, resumes, various documents, sound files, music, moving pictures, pictures, and photographs can be included in the personal contents 100. In the meanwhile, the contents provider can use contents 110 which already exist on the Internet. Each contents provider logs onto a personal contents provider 140 and registers such various contents.

The contents provider uses his/her terminal and reorders, combines, or integrates the contents registered in the personal contents providing system 140 after logging onto the personal contents providing system 140. Contents may be composed of a few pages and the layout of the service can be edited according to the contents provider providing the contents portal service. The contents provider may add communication functions to the contents so that users can use network resources by adding an application program interface (API), which provides a communication capability 120 broken down into components 130 that are received from the personal contents providing system 140 when the reordering of the contents is completed.

Call control, messaging, user interaction, mobility, presence and availability management, and so on, which Open API standardization adopts, are components of the communication capability 120 that the personal contents providing system 140 provides. An API such as a framework which registers and certifies service, terminal capabilities, data session control, a connectivity manager, account management, charging, and policy management, which are related to additional functions, can also be provided by the personal contents providing system 140.

The contents provider may carry out the personal contents service process sequentially using a flow chart after adding communication functions of the contents that he/she has made. In addition, it is possible to schedule when each of the contents is provided. For example, when showing a plurality of pictures sequentially, it is possible to set the time when each of the pictures is shown. The contents, which have the function of communication, can be configured for each communicable terminal and time scheduling can be carried out according to the configured features. For example, some access means to office phones or cellular phones can be added to contents for consulting with a judicial scrivener. In this case, connection time can be scheduled according to the communication terminal.

The personal contents 100 which have the function of communication and scheduling capabilities can be protected by applying security policies, and the range of users who can use the personal contents service can be configured. That is, according to the configuration of the contents provider, the personal contents 100 may be provided to only the users who are registered at the portal site or to all Internet users.

The personal contents which are completed through the above process are provided to the users of the contents such as fixed terminal users 150-1, mobile terminal users 150-2, e-mail users 150-3, and messenger users 150-4, etc. using an open API which has communication functions that are provided by the personal contents providing system 140 through the communication interface, which takes into account the features of each terminal.

Figure 2:
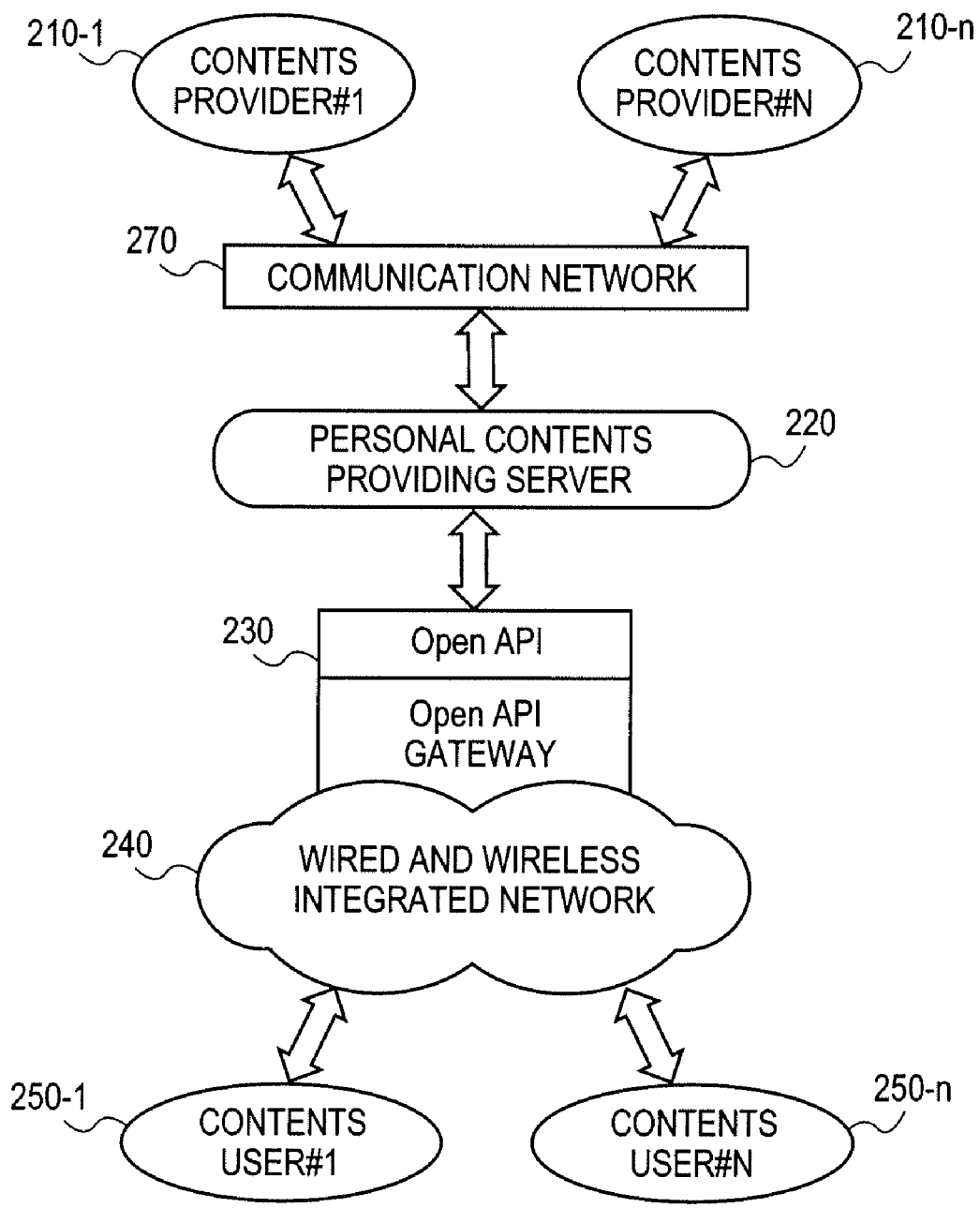
FIG. 2 illustrates a structure of a network according to the present invention.

FIG. 2 is a block diagram of the structure of the network according to the present invention.

Referring to FIG. 2, the network for providing the personal contents service includes contents providing terminals 210-1 through 210-n, a personal contents providing server 220, an open API gateway 230, a wired and wireless integrated network 240, and personal contents user terminals 250-1 through 250-n.

The contents providing terminals 210-1 through 210-n transmit and receive data by logging onto the personal contents providing server 220 via a communication network 270 of the terminal of the contents provider who provides the personal contents service. In addition, the contents user terminals 250-1 through 250-n belong to the contents users who use the personal contents service and transmit and receive data by logging onto the personal contents providing server 220 via the communication network of the terminal of the contents user who uses the personal contents service.

The personal contents providing server 220 uses the open API which is provided by the open API gateway 230 and provides component communication functions to each of the contents providence terminals 250-1 through 250-n via user interface. Each of the contents provider terminals 210-1 through 210-n uses the communication functions, which are provided in components, and the contents that are already registered at the personal contents providing server 220.

The open API gateway 230 uses the personal contents providing server 220 and the open API and communicates with the wired and wireless integrated network 240 via various protocol interfaces. The wired and wireless integrated network 240 is a network that is formed due to the progress and expansion of communication technology.

Figure 3:
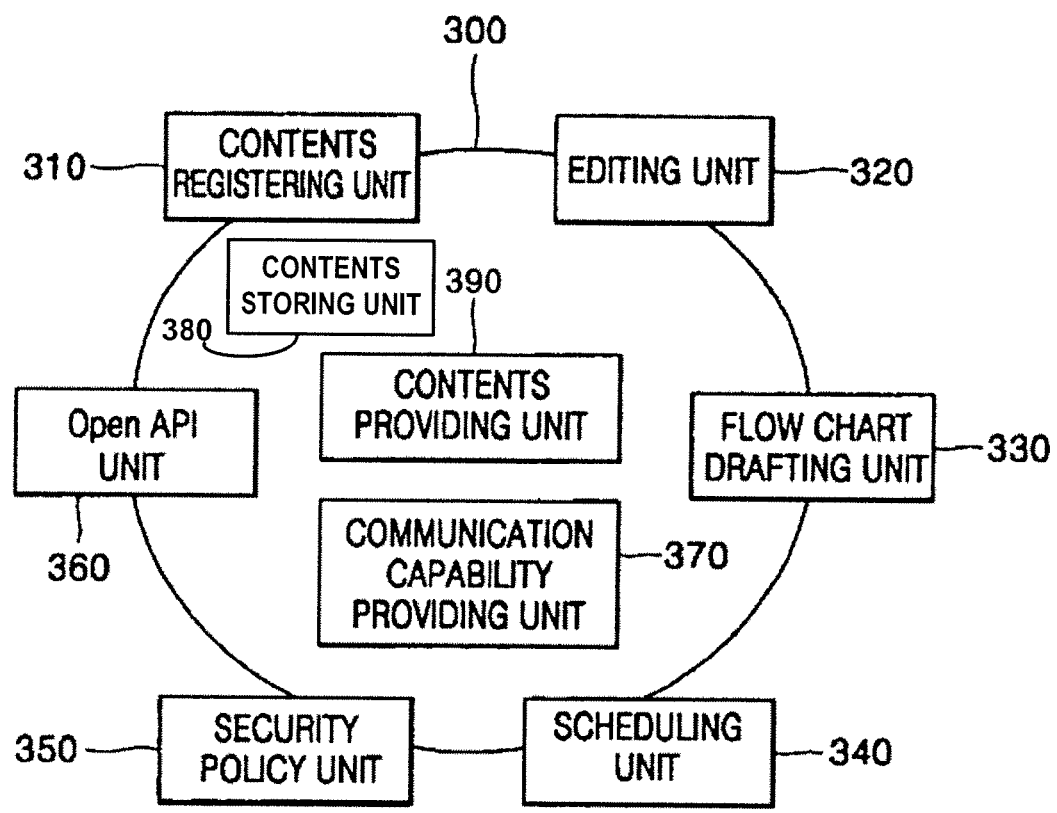
FIG. 3 is a detailed block diagram of a personal contents providing system that opens network resources to a personal user using open API according to an embodiment of the present invention.

FIG. 3 is a detailed block diagram of a personal contents providing server.

Referring to FIG. 3, the personal contents providing server 300 that uses the open API includes a contents registering unit 310, an editing unit 320, a flow chart drafting unit 330, a scheduling unit 340, a securing policy unit 350, an open API unit 360, a communication capability providing unit 370, and a contents providing unit 380.

The contents registering unit 310 stores the contents at the contents storing unit 380 included in the personal contents providing server 300. The editing unit 320 provides combining and editing functions for each of the contents to suit the purposes of the respective services that the contents provider provides. The flow chart drafting unit 330 configures the service so that the contents are provided according to the order set by the contents provider when providing the service of edited contents.

The scheduling unit 340 schedules the time when each of the contents is provided and the priority and the activation time of the communication functions, which are realized by the API that has communication functions added to the contents. The scheduling unit 340 configures the scheduling, priority, and activation time of providing of the contents that have been inputted by the contents provider to the API, and added to the contents. The security policy unit 350 adds a security function to each of the contents according to the configuration of the contents provider or adds a security policy which limits the access by the contents user to the contents. The open API unit 360 provides an API common to the higher application on the basis of a wired and wireless network interface to a contents provider. The communication capability providing unit 370 adds the API, which has the communication function that the contents provider selects, to the contents which the contents provider selects, and adds communication capabilities on the basis of usage of network resources. The contents providing unit 380 provides the contents user with mega contents in which communication capability is included.

Each contents provider who wants to provide personal contents service registers the contents that he/she has made and the contents on the Internet on the personal contents providing server 300, combines and edits the contents using the editing function, and adds a component communication capability on the basis of open API. If needed, the sequential order is recorded in the mega contents that are generated as described above, the schedule is set for each of the contents and the communication functions, and the security policy is configured for the range of service receivers and the security of contents. Each user can receive the intended personal contents service. Mega contents are contents in which multiple contents are integrated.

Figure 4:
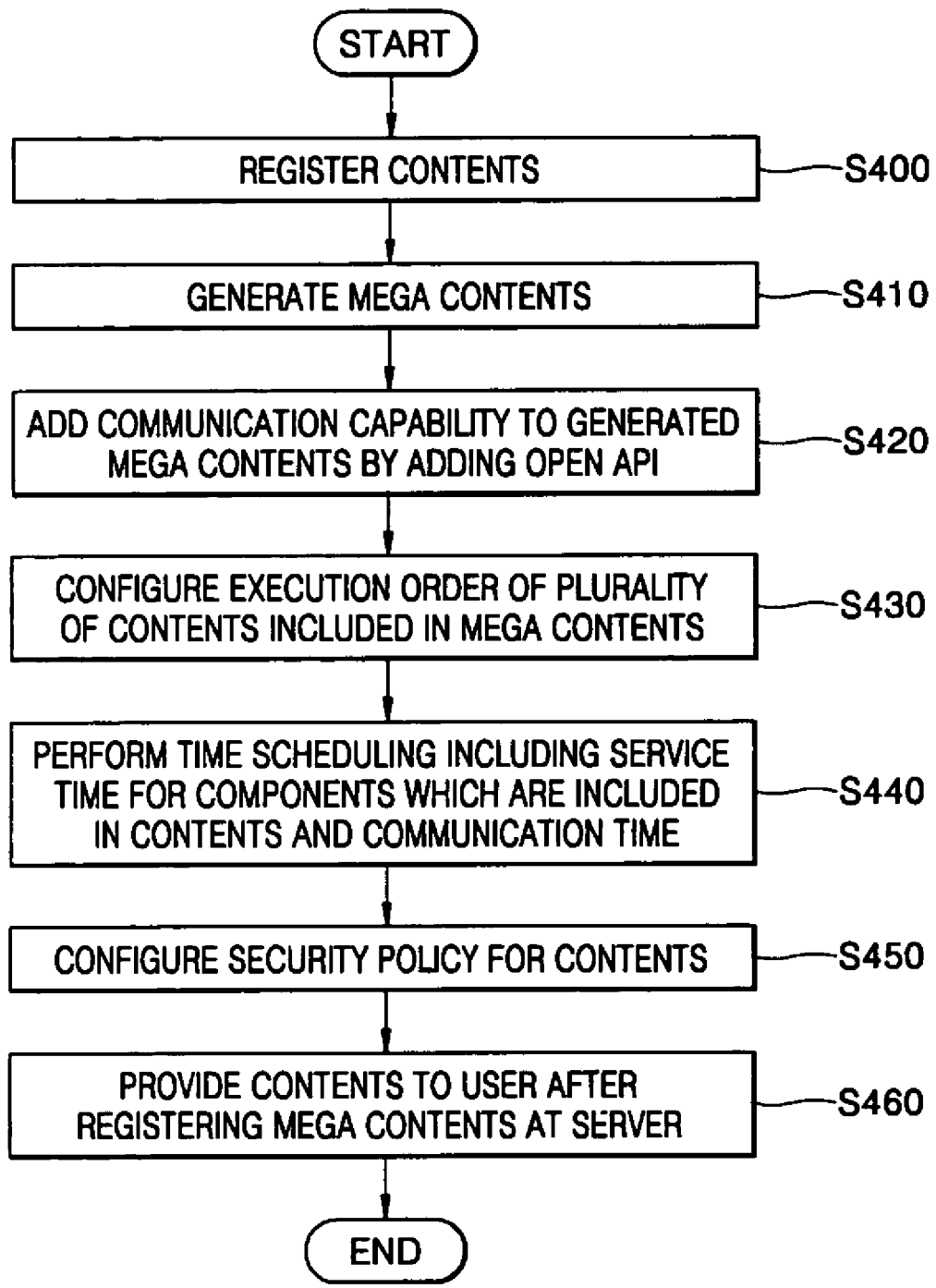
FIG. 4 is a flow chart illustrating an operation process of an embodiment of the present invention of a method of providing personal contents using an open API.

FIG. 4 is a flow chart illustrating a method of providing personal contents which use an open API according to an embodiment of the present invention.

Referring to FIG. 4, a contents provider who wants to provide a personal contents service logs onto a personal contents providing server 300 using his/her terminal and registers the contents that suit his/her purpose in step S400. The contents that the contents provider registers on the personal contents providing server 300 includes contents which the contents provider generates such as profiles, resumes, various documents, music files, moving picture files and existing contents on the Internet. The contents provider may use not only the contents that he/she has registered but also the contents registered on the personal contents providing server 300.

The contents provider reorganizes, rearranges, and integrates the various usable contents and generates contents that suit his/her purpose or generates mega contents that integrates multiple contents into one set of contents in step S410. The editing function of such contents is carried out by the editing unit 330. In addition, the contents provider adds communication capabilities such as call-back, call barring, click-to-call etc., which are provided in components to contents that have been completely edited in step S420.

The call-back function provides a communication means between the contents provider and the contents user and increases the credibility of the contents by recording the signature of the contents provider at the end of the contents. The contents user can communicate with the contents provider by clicking on the signature of the contents provider which is added to the contents. The call barring function blocks an unwanted call from a contents user. The contents user can communicate with the contents provider by clicking on the name of the contents provider included in a contents provider list that is added to the contents using the click-to-call function.

Next, the contents provider configures the order in which a multiple of contents are to be provided in step S430. The contents provider can check whether the order in which the contents are provided has been configured as intended by making a flow chart before configuring the order in which the contents are to be provided. The configuring of the order in which the contents are provided, making the flow chart, and confirmation is performed by the flow chart drafting unit 330. In addition, the contents provider performs time scheduling such as configuration of service time for each element of the contents, configures the communication time according to the schedule of the contents provider, and so on in step S440. The time scheduling function is performed by the scheduling unit 340.

Furthermore, the contents provider configures a security policy for the contents that he/she has generated, or limits the range of users who can use the personal contents service in step S450. For example, service can be provided to only users who are registered on the personal contents portal site or to all Internet users. Personal mega contents that have generated in such a way are registered on the personal contents providing server 300 for portal service and are provided to contents users who log onto the personal contents providing server 300 in step S460. If the contents provider does not want to provide personal contents service any more, he/she can withdraw a request for personal contents service.

Figure 5:
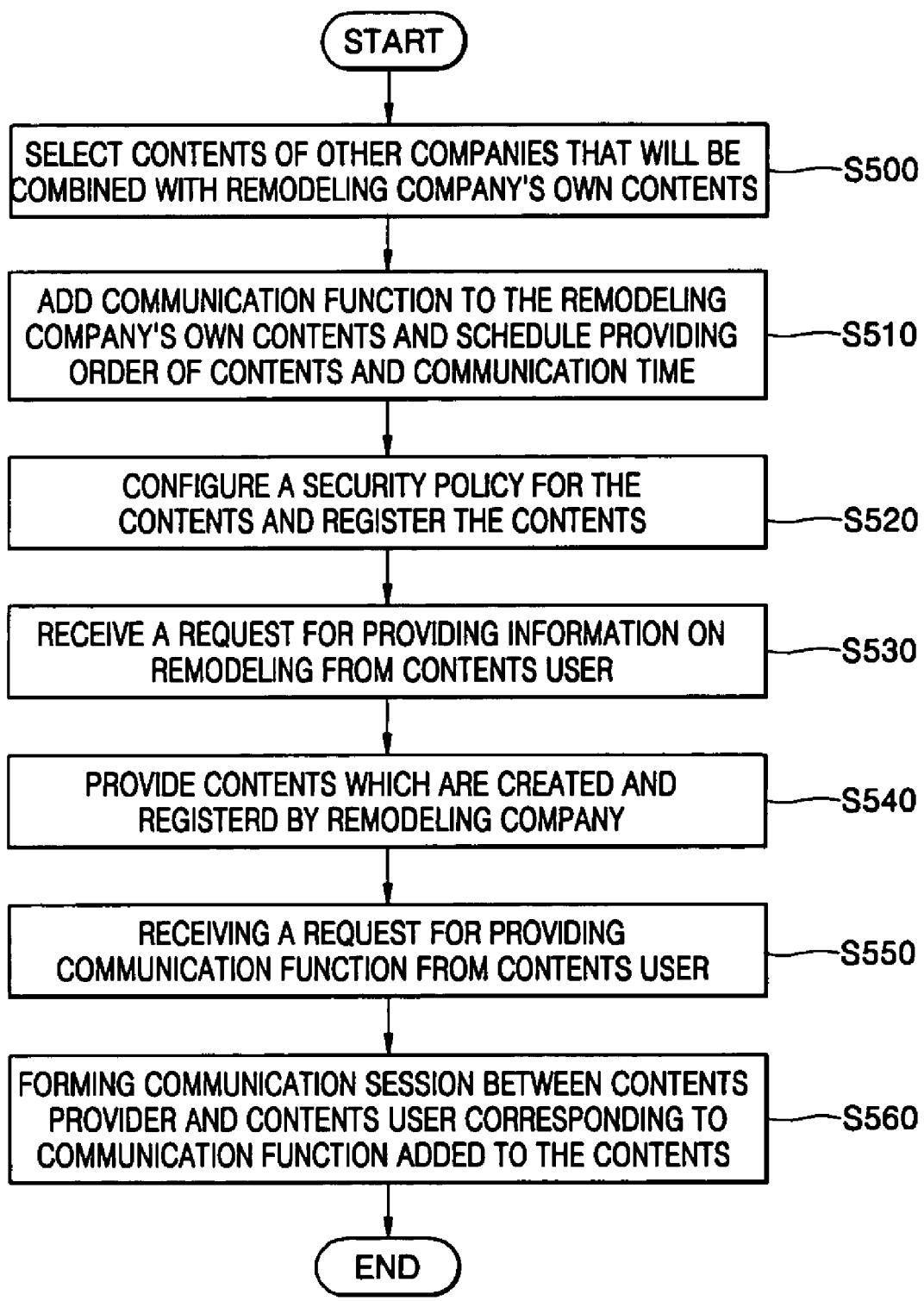

FIG. 5 is a flowchart illustrating a method of providing personal contents using an open API according to an embodiment of the present invention. In the embodiment illustrated in FIG. 5, the contents provider is a remodelling company that provides services by generating mega contents added to communication functions using contents that are registered by each company.

Referring to FIG. 5, the contents providers are individual companies such as a remodelling company, a bathtub manufacturing company, a sink manufacturing company, and a company which specializes in papering walls, ceilings and hypocausted floors. Of these contents providers, the remodelling company uses the contents that are produced by the other companies including the bathtub manufacturing company, the sink manufacturing company, and the company which specializes in papering walls, ceilings and hypocausted floors and registered on the personal contents providing server 300 to generate one set of mega contents.

To carry out a full fledged promotion using the personal contents portal service, the remodelling company sets up a personal contents portal service centred on contents including pictures and moving pictures showing the profiles and accomplishments of the related individual companies. The remodelling company creates contents on the basis of remodelling examples according to the company's profile and apartment size and then selects the contents of individual companies that will be combined with their own contents in step S500. Individual companies create contents for themselves that they manage and are registered on the personal contents providing server 300. The API, which provides the above-described communication functions, is added to the contents of each of the individual companies.

The remodelling company adds communication functions to the mega contents that they have created and schedules the order in which the contents provided and when communication is possible in step S510. In addition, after configuring a security policy for the contents and the users who receive service, the final mega-contents are registered on the personal contents providing server 300 in step 520. If a user who wants remodelling logs onto the personal contents providing server 300 and requests information on remodelling in step S530, the personal contents providing server 300 provides the contents which the remodelling company has created and registered on the personal contents providing server 300 to the user who wants remodelling in step S540.

When receiving a request to provide the communication functions for a certain company (for example, the bathtub manufacturing company) from a user who receives the mega-contents in step S550, the personal contents providing server 300 forms a communication session between the related company and the contents user using the API (for example, a click-to-call function) which is added to the contents in step S560. The personal contents providing server 300 considers the scheduling of the features of the communication terminal of the bathtub manufacturing company and, after confirming the possibility of communication, forms a communication session between the bathtub manufacturing company and the user who wants remodelling according to the security policy. Communication among multiple participants, such as the communication among the remodelling company, the bathtub manufacturing company and users is possible. After communication is completed, the communication session ends. Such a process is carried out in an identical form for not only the remodelling company who created the mega-contents, but also other individual companies who have created and registered contents including mega-contents (that is, the sink manufacturing company, the company which specializes in papering walls, ceilings and hypocausted floors, etc.).

The present invention can be realized as a code on a recording medium readable by a computer. The recording medium, which a computer can read includes all kinds of recording devices which store data that can be read by a computer system. ROM, RAM, CD-ROMs, magnetic tapes, hard disks, floppy disks, flash memory, and optical data storing devices are examples of the recording medium. Furthermore, the recording medium can be accessed from a computer in a computer network, and the code can be stored and executed in a remote method.

According to a system and method for providing contents using an open API according to the present invention, by adding and reediting communication capability components to the contents that are provided to create mega-contents and registering the communication capability components as a portal service, a contents provider can provide a personal contents service suitable to the taste and specialty of each individual, company and organization and the purpose of providing service. Furthermore, by using an open API, network resources may be safely disclosed to a third party independently of the network's feature and protocol, and by using the communication functions, communication functions with another party may be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A contents providing system using an open application program interface (API), the system comprising:
  a contents storing unit, which stores contents registered by contents providers;
  an open API unit on a contents providing server, which provides an API that is common to users on the basis of a wired and wireless network interface and has a communication capability formed with components;

a communication capability providing unit, which adds the communication capability to selected contents stored in the contents storing unit used by a contents provider by combining the selected contents with the API;

a scheduling unit, which schedules the time for providing the selected contents, a priority and activation time of the communication capability realized by the API;

an editing unit, which is used by the contents provider to edit the selected contents from the contents storing unit; and a contents providing unit which provides the selected contents to which the communication capability is added to a contents user;

a contents user terminal, which allows the contents user to request additional information to the contents provider and receive response to the request from the contents provider through the communication capability.

2. The system of claim 1, further comprising a security policy unit which adds a security function to the selected contents or limits the contents user's access to the selected contents.

3. The system of claim 1, further comprising a contents registering unit which registers in the contents storing unit contents received from a communication terminal of the contents provider and contents received from other contents providing systems that are connected to a network.

4. The system of claim 1, wherein the scheduling unit allocates priority to the selected content and wherein the editing unit creates a mega-contents composed of the selected contents of which priority is allocated.

5. The system of claim 4, further comprising a flowchart drafting unit preparing a flowchart to determine whether the selected contents are provided according to a service order.

6. The system of claim 1, wherein the API includes at least one of a call-back function which configures a communication pathway between the contents user and the contents provider by linking a connection means of a communication terminal of the contents provider to a signature of the contents provider which is added to the selected contents, a call barring function which blocks a call connection to the user terminal the selected contents is provided and configured by the contents provider, and a click-to-call function which provides to a contents user a list linked to a connection means of communication terminals of a plurality of contents providers, and configures a communication pathway between the contents provider providing the selected contents that the content user selects and the contents user.

7. The system of claim 1, wherein the API includes a function that facilitates communication between a communication terminal of the contents provider and the contents user terminal when the contents user wants to communicate with the contents provider.

8. A method for providing contents using an open application program interface (API), the method comprising:

registering the contents produced by a contents provider, wherein registering stores the contents in a contents storing unit;

using selected contents from the contents storing unit by the contents provider which are either produced by the contents provider or previously registered by other contents providers that are connected to a communication network;

providing an editing function to allow the selected contents from the contents storing unit by the contents provider to be edited by the contents provider;

providing an API on a contents providing server, wherein the API is common with users on the basis of a wired and wireless network interface and has a communication capability formed with components;

adding the communication capability to the selected contents by combining the selected contents with the API selected by the contents provider;

scheduling a time for providing the selected contents, a priority and activation time of the communication capability realized by the API; and providing the selected contents to which the communication capability is added to a contents user terminal;

requesting additional information by a contents user via the contents user terminal to the contents provider and receiving a response to the request from the contents provider through the communication capability.

9. The method of claim 8, further comprising adding a security function to the selected contents and providing a security policy which limits a user's access to the selected contents, before providing the selected contents to the contents user terminal.

10. The method of claim 8, further comprising editing the selected contents before providing the selected contents to the contents user terminal.

11. The method of claim 10, wherein the editing step comprises: allocating service priority to the selected contents; and creating mega-contents composed of the selected contents to which service priority is allocated.

12. The method of claim 8, wherein the API includes at least one of a call-back function which configures a communication pathway between the contents user and the contents provider by linking a connection means of a communication terminal of the contents provider to a signature of the contents provider which is added to the selected contents, a call barring function which blocks a call connection to the contents user terminal the selected contents is provided and configured by the contents provider, and a click-to-call function which provides to the contents user a list linked to a connection means of communication terminals of a plurality of contents providers, and configures a communication pathway between the contents provider providing the selected contents that the contents user selects and the contents user.

13. The method of claim 8, wherein the API includes a function that facilitates communication between a communication terminal of the contents provider and the contents user terminal when the contents user wants to communicate with the contents provider.

14. A recording medium that can be read by a computer to which a program for performing a method of providing contents using an open application program interface (API) is recorded, the method comprising:

registering the contents produced by a contents provider, wherein registering stores the contents in a contents storing unit;

using selected contents from the contents storing unit by the contents provider which are either produced by the contents provider or previously registered by other contents providers that are connected to a communication network;

providing an editing function to allow the selected contents from the contents storing unit by the contents provider to be edited by the contents provider;

providing an API on a contents providing server, wherein the API is common with users on the basis of a wired and wireless network interface and has a communication capability formed with components;

adding the communication capability to the selected contents by combining the selected contents with the API selected by the contents provider;

scheduling the time for providing the selected contents, a priority and activation time of the communication capability realized by the API; and providing the selected contents to which the communication capability is added to a contents user terminal;

requesting additional information by a contents user via the contents user terminal to the contents provider and receiving a response to the request from the contents provider through the communication capability.

* * * * *